W. LEHMAN.
Bee-Hives.
No. 135,566. Patented Feb. 4, 1873.
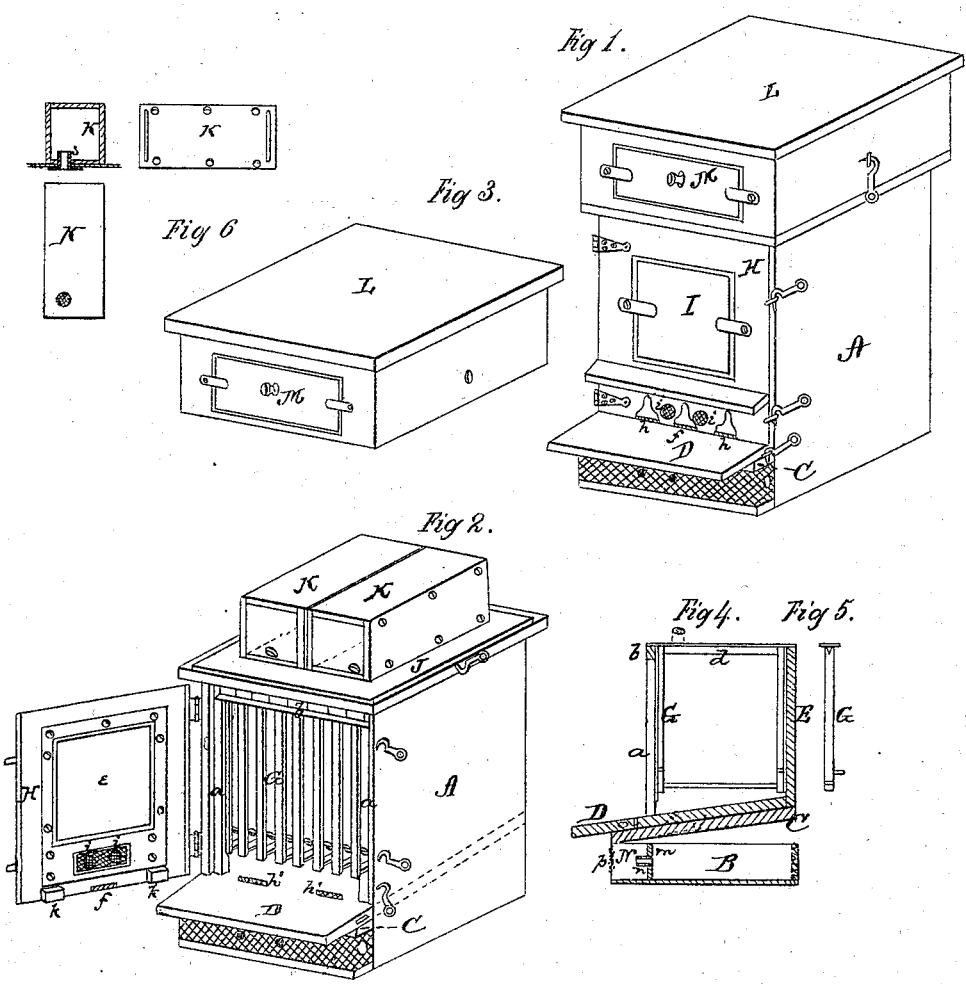
Witnesses.
Alfred J. Hall.
Charles G. Ludwigs.
Inventor.
William Lehman.
AM. PHOTO-LITHOGRAPHIC CO. N.Y. (OSBORNE'S PROCESS.)

UNITED STATES PATENT OFFICE.

WILLIAM LEHMAN, OF LEXINGTON, MISSOURI.

IMPROVEMENT IN BEE-HIVES.

Specification forming part of Letters Patent No. 135,566, dated February 4, 1873.

*To all whom it may concern:*

Be it known that I, WILLIAM LEHMAN, of Lexington, in the county of Lafayette and State of Missouri, have invented certain new and useful Improvements in Bee-Hives; and I do hereby declare the following to be a full, clear, and exact description thereof, reference being had to the accompanying drawing and to the letters of reference marked thereon.

The nature of my invention consists in the construction and arrangement of a bee-hive whereby the bees are protected and secured against moth and all other insects; the severity of cold, rain, snow, and sleet; and from being robbed by other bees; and also for keeping the honey always white and clean.

In order to enable others skilled in the art to which my invention appertains to make and use the same, I will now proceed to describe its construction and operation, referring to the annexed drawing, which forms a part of this specification, and in which—

Figure 1 is a perspective view of my entire bee-hive closed. Fig. 2 is a similar view of the same with the door open and the upper cap removed. Fig. 3 is a perspective view of the upper cap. Fig. 4 is a longitudinal vertical section of the interior structure of the hive. Fig. 5 is a side view of one of the comb-frames, and Fig. 6 shows one of the honey-boxes.

A represents the body of the hive of any suitable dimensions, in the bottom of which is a drawer, B, and above the same is an inclined partition, C, forming the stationary bottom of the brood-chamber. Upon this stationary bottom is laid a movable bottom, D, to which is attached a back, E. At the front of the brood-chamber, from the sliding bottom D, rise two posts, $a\ a$, which are connected at their upper ends by a cross-bar, $b$, on a level with the top of the back E. Upon the cross-bar $b$ and the back E are hung the comb-frames G G by their top-bars, extending beyond the side bars, as shown in Fig. 4. The top bars of the frames G are also wider than the side and bottom bars, as seen in Fig. 5, and to the under sides of the said top bars are attached the comb-guides $d$, which are made in wedge or triangular shape, the base being of the same width as the side bars of the frames. The front of the brood-chamber above the sliding bottom D forms a hinged door, H, having a smaller door, I, in it, behind which smaller door is a glass or other transparent plate, $e$. In the lower edge of the door are three entrances, $f$ and $h\ h$, the middle entrance $f$ being for the bees to pass into the hive, while the side entrances $h\ h$ are for moth or other insects to go in through, and then through corresponding passages, $h'\ h'$, through the bottoms D and C, into the drawer B. On the inside of the door H are attached boxes $k\ k$, which are open on their under sides, and when the door is closed said boxes cover the passages $h'\ h'$, so that any insects passing in through the entrances $h\ h$ cannot go into the hive, but must pass into the drawer B. The entrances $f$ and $h\ h$ may be closed by suitable sliding or other doors, as shown in Fig. 1. Above these entrances are suitable wire-cloth-covered ventilating openings $i\ i$. The front of the drawer B is provided with wire-cloth $p$, and a suitable distance from the same, in the drawer, is a partition, $m$, with two small tubes, $n\ n$, leading from the main part of the drawer into the chamber N formed between said partition $m$ and the wire-cloth front $p$. J represents the top of the brood-chamber, in which are arranged two tubes, $s\ s$, over which are placed the honey-boxes K K, the whole being covered by a cap, L, and in the front of said cap is a door, M, as shown.

The moth or other insects enter through the passages $h\ h$ and $h'\ h'$ into the box B and through the tubes $n\ n$ into the chamber N, from whence they cannot return, but must remain until dead or removed.

The rack composed of the sliding bottom D, back E, posts $a\ a$, and cross-bar $b$ may be removed from the hive with the combs supported upon said rack at any time when desired.

The comb-guides $d\ d$ being placed in the center of the top bars of their respective frames enable the bees to build the comb in the center of the rack, so as to leave a clear space between the combs directly under the joint, which prevents the combs from being connected by the bees.

The bees enter the comb-rack by the passage $f$ under the door in front, and at once pass up each side of the box, on the two posts $a\ a$, to all parts of the box, and from that to the honey-boxes on the top of the hive without passing over any part of the comb, which leaves the honey clean, pure, and white.

The comb-frames, when placed upon the movable rack, form a solid top, which prevents the bees, in building, from connecting the top-pieces together, or the said top pieces to the main top J of the chamber and leaves the movable or sliding rack to act freely at all times, so that it can be drawn out or pushed in at pleasure, which gives free access to and full control over the bees at all times.

In the rear of the box A is made a small hole to allow a way of escape for the bees which may chance to get behind the slide-rack, which, when pushed into its place, leaves a space of half an inch between the back of the box and the back E of the rack, in which space the bees are safe from harm and can pass out the said hole for future work, where otherwise they would be crushed to death.

The top J of the hive projects beyond the sides of the box and has an offset upon which the cap L stands, thereby preventing rain or dampness from any cause from reaching the brood-chamber below.

The slide $x$ to the main entrance $f$, when shut down, and the slides $y$ $y$ to the side entrances $h$ being raised, catch all bees robbing the hive, the hive in the meanwhile receiving light and air through the ventilators $i$ $i$ in front, which are covered with wire-cloth to keep out insects.

$z$ is a board on the door H projecting over the ventilators, and keeps the entrance from being closed by snow or sleet, and keeps open the air-passages at all times.

In cold weather, or when the hives are to be moved or shipped to market, the slides can be closed and the bees confined safely in the hive, the ventilators giving all air and light necessary.

Having thus fully described my invention what I claim as new, and desire to secure by Letters Patent, is—

1. The interior sliding rack, consisting of the inclined bottom D, back E, and posts $a$ $a$, with cross-bar $b$ for supporting the comb-frames G G, substantially as and for the purposes herein set forth.

2. In combination with the entrances $h$ $h$ and passages $h'$ $h'$ into the moth-drawer, the boxes $k$ $k$ attached to the inside of the door H, substantially as and for the purposes herein set forth.

WILLIAM LEHMAN.

Witnesses:
ALFRED J. HALL,
CHARLES G. LUDWIGS.